Figure 3:
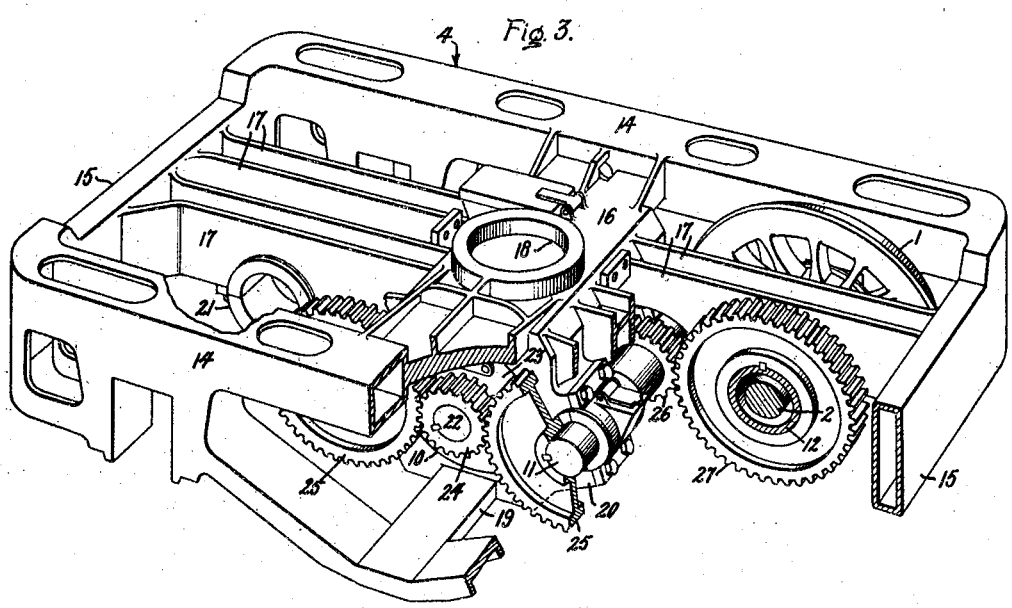

March 21, 1933.    F. B. HOWELL    1,902,504
TRUCK
Filed Sept. 29, 1931    2 Sheets-Sheet 1
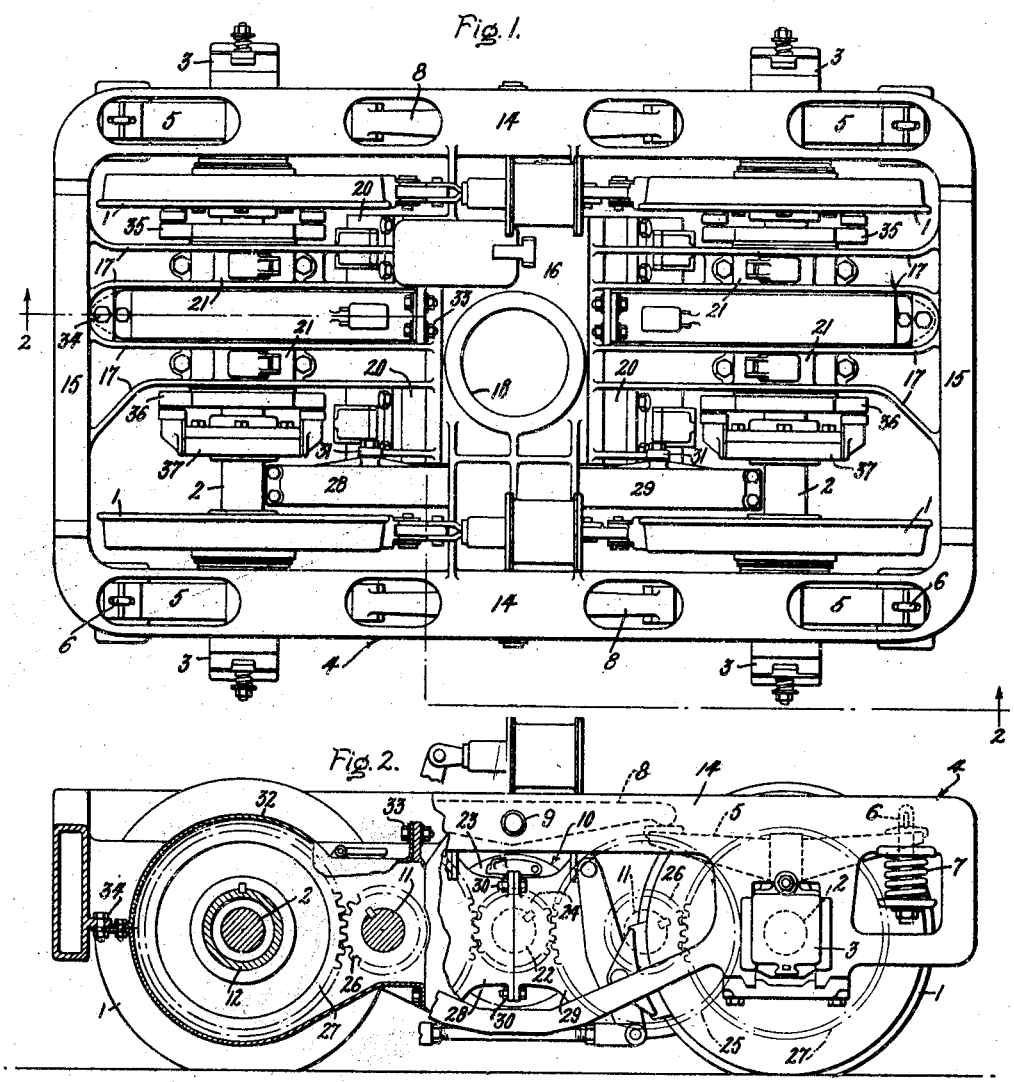
Inventor:
Fred B. Howell,
by Charles A. Mullan
His Attorney.

March 21, 1933.  F. B. HOWELL  1,902,504
TRUCK
Filed Sept. 29, 1931  2 Sheets-Sheet 2

Inventor:
Fred B. Howell,
by Charles E. Mullen
His Attorney.

Patented Mar. 21, 1933

1,902,504

UNITED STATES PATENT OFFICE

FRED B. HOWELL, OF SCHENECTADY, NEW YORK, ASSIGNOR TO GENERAL ELECTRIC COMPANY, A CORPORATION OF NEW YORK

TRUCK

Application filed September 29, 1931. Serial No. 565,819.

My invention relates to trucks for electrically propelled locomotives or cars of the type having a driving motor and connections between the motor and the wheels of the vehicle which are carried by a truck frame spring borne on the wheels and axles so that the unsprung weight of the truck is reduced to a minimum.

The object of my invention is to provide a truck of this type having an improved arrangement of the motor and driving connections between the motor and the axle.

Further objects and advantages of my invention will become apparent as the following description proceeds, and the features of novelty which characterize my invention will be pointed out with particularity in the claims annexed to and forming a part of this specification.

In the drawings Fig. 1 is a plan view of a truck embodying my invention; Fig. 2 is a side elevation, partly in section, taken on line 2—2 of Fig. 1; and Fig. 3 is a perspective view, partly broken away, of parts of Fig. 1 more clearly illustrating the construction.

Referring to the drawings, the truck which I have shown embodying my invention includes driving wheels 1 secured to a pair of spaced axles 2 in the usual manner, and journal boxes 3 for supporting a rectangular frame 4 of the truck on the axles 2. The frame 4 is resiliently supported on the axles 2 by leaf-springs 5 resting intermediate the ends thereof on the journal boxes 3 and having their outer ends connected to the frame by links 6 through coil springs 7. Load is transmitted from the truck frame to the inner ends of the springs 5 by equalizers 8 resting thereon which are pivotally connected to the frame as indicated at 9, so as to longitudinally equalize the springs and distribute shocks on each side of the truck.

In accordance with my invention the truck frame 4 is constructed in such manner that a simplified unitary structure is obtained, which comprises a frame of a driving motor 10 and reduction gearing including countershafts 11 and quill shafts 12, which are loosely arranged on the axles and flexibly coupled thereto, for transmitting power from the motor to the wheels of the truck. By this arrangement the only unsprung weight of the truck is that of the wheels 1, the axles 2, and journal boxes 3.

The truck frame 4 includes side frames or members 14 connected together at the ends thereof by transverse members 15, a transom 16 integral with the side frames, and spaced longitudinal members 17 extending between the transom and the transverse members. A center plate 18 is provided on the transom for supporting the body of the locomotive or car. The truck frame is preferably made of a single casting although it may be made in separate parts secured together by welding, or in any other suitable manner. In this construction the transom also forms the frame of the driving motor 10, which extends below the top of the truck frame and between the side frames 14 in the space between the axles. The bottom of the motor frame is connected at each end to the side frames 14 by members 19, as shown in Fig. 3, to reinforce the truck frame. The countershafts 11 are arranged in bearings 20, which extend outwardly from each side of the motor frame and form a part thereof, and the quill shafts 12 are arranged in bearings 21 supported by the longitudinal members 17. The motor shaft, countershafts, quill shafts and axles have their axes in horizontal alignment, so that a compact arrangement of the reduction gearing is obtained without making the height of the truck any greater than the usual single reduction gear type.

The motor 10 comprises a shaft 22 arranged in bearings carried by removable end heads 23 at each end of the motor frame, which enclose the motor. The reduction gearing connecting the motor and quill shafts includes a pinion gear 24 on the motor shaft 22 which engages gears 25 on the countershafts 11, and gears 26 on the countershafts which engage driving gears 27 mounted on the quill shafts 12. Since the countershafts and quill shafts are carried by the frame 4 the gears will always be maintained in proper alignment with each other. This compact arrangement of the gearing in the spaces between the transom 16 and the transverse members 15, gives a double reduction in speed from the motor 10 to the axles, which is desirable where a truck must have a high tractive effort or torque at slow speed. The gears are protected by enclosing them in suitable casings formed of two parts bolted together as shown in Figs. 1 and 2, the pinion gear 24 and gears 25 being enclosed by two casings 28 and 29 bolted together as indicated at 30, and supported by webs 31 on the motor frame, and the gears 26 and 27 being enclosed in casings 32 secured to the motor frame and the transverse members 15 as indicated at 33 and 34 respectively.

The quill shafts 12 and the axles 2 are connected by flexible couplings of any suitable construction such for example as that shown in United States Letters Patent No. 1,780,105, granted October 28, 1930 on an application of R. G. Anderson, and assigned to the same assignee as this invention. Referring to Fig. 1, the flexible drives connect driving plates 35 and 36 attached to the quill shafts 12 to the driving wheels 1 and driven plates 37, which are rigidly secured to the axles 2. This permits the unitary spring borne frame 4, which carries the motor 10 and the reduction gearing including the countershafts 11 and quill shafts 12, to move freely upon the springs 5 and relative to the wheels and axle, when the truck passes over irregularities or curves in the tracks.

The simplified construction of this truck has the advantage that the wheels and axles with the quills thereon can be readily removed from the truck frame for it is only necessary to remove the gear casings, and the caps of the bearings 20 on the quill shafts 12. In this manner the wheels and axles with the quill shafts 12, and the flexible driving connections between the quill shafts and axles, can be removed as a unit from the frame 4.

It will thus be seen that I have provided an improved and simplified truck having a unitary frame structure which is light, strong and rigid in construction, although the wheel base and the height of the truck are substantially the same as those of trucks heretofore built. The compact arrangement of the double reduction gearing permits the use of a high speed motor of a lower rating than previously used when a high tractive effort or torque at slow speed is required.

Modifications of the form of my invention which I have described will occur to those skilled in the art, so that I desire my invention not to be limited to the particular arrangement set forth, and I intend in the succeeding claims to cover all modifications thereof which do not depart from the spirit and scope of my invention.

What I claim as new and desire to secure by Letters Patent of the United States, is:

1. A truck including wheels and an axle, a truck frame, resilient means for supporting said truck frame on said wheels and axle, said truck frame having a transom and longitudinal members extending between said transom and the ends of said truck frame, a motor provided with a frame and carried by said truck frame, means including reduction gearing having a countershaft and a quill shaft surrounding said axle for connecting said motor to said axle, means including bearings for securing said countershaft to said motor frame and said quill shaft to said longitudinal members, and a flexible connection between said quill shaft and said axle.

2. A truck including wheels and an axle, a truck frame, resilient means for supporting a truck frame on said wheels and axle, a motor, said truck frame having a transom comprising a frame for said motor, longitudinal members extending between said motor frame and the ends of said truck frame, means including reduction gearing having a quill shaft surrounding said axle for connecting said motor to said axle, means for securing said quill shaft to said longitudinal members, and a flexible connection between said quill shaft and said axle.

3. A truck including wheels and an axle, a truck frame, resilient means for supporting said truck frame on said wheels and axle, a motor, said truck frame having a transom comprising a frame for said motor, longitudinal members extending between said motor frame and the ends of said truck frame, means including reduction gearing having a countershaft and a quill shaft surrounding said axle for connecting said motor to said axle, means including bearings for securing said countershaft to said motor frame and said quill shaft to said longitudinal members, and a flexible connection between said quill shaft and said axle.

4. A frame for a truck comprising side members and transverse members connecting said side members, a transom constituting the frame of an electric motor, longitudinal members connecting said transom and one of said transverse members, and means including bearings secured to said longitudinal members and constituting supports for reduction gearing having a quill shaft for connecting the motor to the axle.

5. A frame for a truck comprising side members and transverse members connecting said side members, a transom constituting the frame of an electric motor, longitudinal members connecting said motor frame and one of said transverse members, and means including bearings secured to said motor frame and said longitudinal members and constituting the supports for reduction gearing having a countershaft and a quill shaft for connecting the motor to the axle.

6. A truck including wheels and two axles, a truck frame comprising side members and transverse members, resilient means for supporting said truck frame on said wheels and axles, a single electric motor having a frame forming a transom for said truck frame, longitudinal members extending between said motor frame and said transverse members, means including reduction gearing having a countershaft on each side of said motor and a quill shaft surrounding each of said axles for connecting said motor to said axles, means including bearings for securing said countershafts to said motor frame and said quill shafts to said longitudinal members, and flexible driving connections between said quill shafts and their respective axles.

7. A truck including wheels and two axles, a truck frame, resilient means for supporting said truck frame on said wheels and axles, said truck frame having a transom between said axles and longitudinal members extending between said transom and the ends of said truck frame, a motor having a frame carried by said truck frame, said motor having a shaft provided with a pinion gear, a pair of countershafts on each side of said motor and provided with a plurality of gears and a pair of quill shafts provided with driving gears and surrounding said axles, one of the gears on said countershafts engaging the pinion on said motor shaft and the other of the gears on said countershafts engaging the driving gears on the respective quill shafts for connecting said motor to said quill shafts, means including bearings for securing said countershafts to said motor frame and said quill shafts to said longitudinal members, and flexible driving connections between said quill shafts and their respective axles for allowing relative movements therebetween.

In witness whereof, I have hereunto set my hand.

FRED B. HOWELL.